March 28, 1967  E. R. GILL, JR  3,311,441
REFLECTOR
Filed April 3, 1963

INVENTOR
Edwin R. Gill, Jr.

BY Karl W. Flocks
ATTORNEY

United States Patent Office 3,311,441
Patented Mar. 28, 1967

3,311,441
REFLECTOR
Edwin R. Gill, Jr., R.F.D. 2, Millerton, N.Y. 12546
Filed Apr. 3, 1963, Ser. No. 270,450
4 Claims. (Cl. 350—105)

The present invention relates to a reflector and more particularly to a reflector adapted to reflect a ray of light back along its own incident ray.

In the past, many types of reflectors have been proposed. In general, such prior reflectors have been reflex reflectors wherein a ray of light is returned to its source as a diverging cone of light. Autocollimators have also been proposed which return a ray of light to its source in a ray which is parallel to its incident ray. Heretofore, suitable apparatus has not been proposed to reflect a ray of light back to its source along its own incident ray.

It is therefore an object of the present invention to provide a novel reflector which reflects back a ray of light substantially in the same straight line.

It is a further object of the present invention to provide a novel reflector which reflects back light having an improved brightness, and an improved depth and intensification of color.

Other objects and the nature and advantages of the invention will be apparent from the following description taken in conjunction with the accompanying drawings, wherein.

Figure 1:
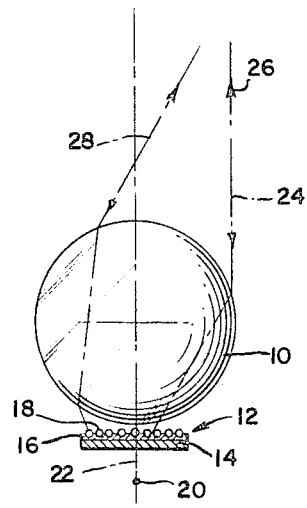
FIG. 1 is an enlarged view of a reflector in accordance with the present invention.
Figure 2:
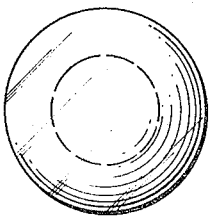
FIG. 2 is a top plan view of FIG. 1.

According to the present invention, a reflector called a "collinear reflector" is obtained by locating a short focus lens, which may be in the form of a sphere of relatively large diameter, in front of a reflex reflecting surface made up of a plurality of glass beads having a relatively small diameter partially embedded or in contact with a reflecting surface.

Referring to the drawings, a spherical lens 10, which may be of glass or other transparent material is located above a disk 12, having a fine grained reflex reflecting surface. The disk 12 is composed of a base or backing 14 having a coating 16 of a reflective binder into which a plurality of glass beads 18 are partially embedded. The point of focus of the lens 10 is shown at 20, located on the center line 22 passing normal to the disk 12. An incident ray of light 24 is shown parallel to the center line 22. This ray is also the path of the reflected ray as shown by the arrow 26; thus the reflected ray may be referred to as the collineated ray. The incident ray of light 28 is shown to be at an angle to the center line 22 and again the returned ray follows the same path as the incident ray.

Figure 3:
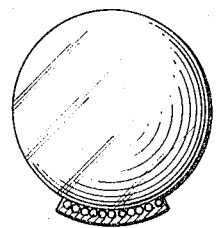
FIG. 3 is a view similar to FIG. 1 of a modified form of the reflector.

The reflex reflecting disk 12 is located at a point between the point of focus 20 of the lens 10 and the lower side of the lens. The exact location of the disk is not critical provided it is above the focal distance of the lens. However, for best results, the reflex reflecting surface should be close to the lens. As shown in FIG. 3, the reflex reflecting surface is curved to correspond to the curve of the bottom of the lens and is in contact therewith.

The refractive index of the lens 10 should be less than 1.70 so as to insure that internal reflection is at a minimum. The preferred index of refraction is in the range of 1.50–1.56. The lens 10 may be made of clear common glass—crown or light flint.

The refractive index of the beads 18 may be high; i.e., above 1.70. However, if it is important to reflect the color of the reflective binder 16, then the refractive index should be under 1.70.

The reflector in accordance with the present invention, which is called a "collineator," may be of any size providing that the condensing lens has a diameter which is very much greater than the beads comprising the reflex reflecting surface. Preferably the lens should be 30–100 times the bead size, or even more. For example, if the glass beads measure 1 mil in diameter, the lens may be about 1/20 inch in diameter or greater. The reflex reflecting disk for such a small lens may be only 10 mils in diameter having approximately 75–80 glass beads. Using ½ mil beads, the number of beads would be in excess of 300. Such small lenses are useful for certain purposes, but ordinarily considerably larger ones would be used. Good results have been obtained using ½ inch diameter glass spheres 10 in conjunction with a flat reflex reflecting surface composed of glass beads graded from 10–15 mils. Thus, the beads average approximately 1/40 the diameter of the lens. The flat beaded surface was practically in contact with the lower face of the lens.

Figure 4:
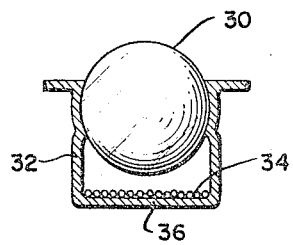
FIG. 4 is a cross-sectional view of a reflector button.
Figure 5:
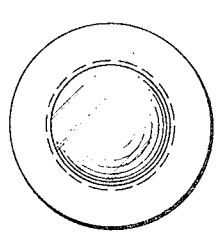
FIG. 5 is a top plan view thereof.

An example of a reflector button utilizing the present invention is shown in FIGS. 4 and 5. A spherical lens 30 is held in position by a case 32 of drawn metal, plastic or the like. The reflex reflecting surface of glass beads 34 is held on the flat base 36 of the case 32. The size of the reflector button can be varied by the size of the lens used, modifying the size of the glass beads accordingly so that they are approximately 1/50 of the size of the lens.

Figure 6:
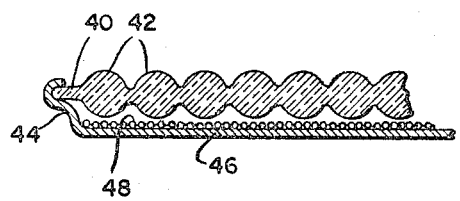
FIG. 6 is a cross-sectional view of a reflector panel.
Figure 7:
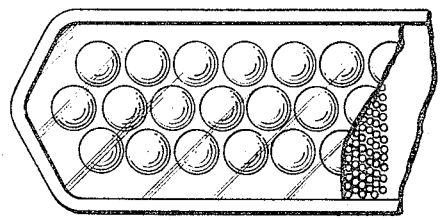
FIG. 7 is a top plan view of the reflector panel of FIG. 6.

A collineator in panel form is shown in FIGS. 6 and 7. A transparent plate 40 having a plurality of spherical knobs 42 molded therein is mounted in a casing 44 having a flat bottom surface 46. The reflex reflecting coating 48 is applied onto the upper surface of the bottom of the casing.

In the prior art reflex reflectors, the focus is critical, yet the spheres utilized do not have a precise focal length due to spherical aberration. Thus, the reflected beam of light is always returned as a diverging cone of light of a considerable angle. Furthermore, due to the crossing over of the reflected ray to the opposite side of the center line from the incident ray, the error caused by spherical aberration is increased since the refractions are in the same direction and therefore the error is cumulative. In collineation, in accordance with the present invention, on the contrary, the incident and reflected rays enter and leave the lens at substantially the same point, and as they traverse the lens on the same side of the center line, the refractions bend the ray twice in one direction and twice in the opposite, so that the error cancels itself. This is an important feature since the problem of spherical aberration is thus eliminated and the entire face of the lens is simultaneously collineative.

In the collineators described herein, the reflex reflective surface is located close to the under face of the lens, so that the divergence of the reflected rays is extremely small before re-entering the body of the lens so that it finally emerges from the lens at substantially the same point at which the incident ray first entered. The end result is that the collineated ray substantially back tracks its particular incident ray in the same straight line.

The collineators of the present invention have many advantages over the prior art reflex reflective surfaces. The glass beads of a reflex reflective surface always show inactive portions or blank areas which vary with the angle of incidence. On the contrary, the entire obverse face of the collineator is active at all operative angles of incidence.

The collineators of this invention have notably greater brilliance in comparison with reflex reflective surfaces, and due to the small divergence of the returning light, the intensity of the reflected beam persists for a greater distance. At a distance where conventional reflex reflectors begin to fade, the brilliance of the collineated beam is still undiminished.

Another advantage of collineators according to the present invention is the increased intensification of the color reflected. A reflex reflective surface colored yellow, for example, with a macroluminescent dye showed a certain depth and brightness of color when tested. An exactly similar surface mounted in back of a collineating lens in accordance with this invention was several times as bright with an increased depth and intensification of color using the same illumination.

For simplicity, the drawings have shown the lens 10 to be a sphere, however other optical forms may be employed such as a cylinder, ellipsoid and the like.

The collineators of the present invention have many uses other than the reflectors shown in FIGURES 4-7. This principle may be used in any device wherein it is desired to reflect back a ray of light along its incident ray.

It will be obvious to those skilled in the art that various changes may be made without departing from the spirit of the invention and therefore the invention is not limited to what is shown in the drawings and described in the specification, but only as indicated in the appended claims.

What is claimed is:

1. A reflector for reflecting a ray of light back along its own incident ray comprising a short focus transparent spherical lens having an outer exposed surface, a reflex reflecting surface adjacent the rear surface of said lens and intersecting a plane which is approximately perpendicular to said reflex reflecting surface and which passes through the center of said lens, said reflex reflecting surface comprising a plurality of light transmitting glass beads in contact with a reflecting surface, said lens having a diameter at least 30 times the size of said glass beads and having an index of refraction less than 1.70, said glass beads being located between said lens and said reflecting surface, said reflex reflecting surface being located between said rear surface of said lens and the point of focus of said lens.

2. A reflector in accordance with claim 1 wherein said reflex reflecting surface is curved to conform to the rear surface of said lens.

3. A reflector button comprising a casing, a short focus transparent spherical lens mounted in said casing with the outer surface of said lens exposed, a reflex reflecting surface inside of said casing behind said lens and intersecting a plane which is approximately perpendicular to said reflex reflecting surface and which passes through the center of said lens, said reflex reflecting surface comprising a plurality of light transmitting glass beads in contact with a reflecting surface, said lens having a diameter at least 30 times the size of said glass beads and having an index of refraction less than 1.70, said glass beads being located between said lens and said reflecting surface, said reflex reflecting surface being located between the rear surface of the lens and the point of focus of said lens.

4. A reflector panel comprising a casing, a transparent plate mounted in said casing with the upper surface of said plate exposed, said plate comprising a plurality of connected spherical lenses, a reflex reflecting surface inside of said casing behind said plate, said reflex reflecting surface comprising a plurality of light transmitting glass beads in contact with a reflecting surface, said lenses having a diameter at least 30 times the size of said glass beads and having an index of refraction less than 1.70, said glass beads being located between said lenses and said reflecting surface, said reflex reflecting surface being located between the rear surface of the spherical lenses and the point of focus of said lenses.

References Cited by the Examiner

UNITED STATES PATENTS

| | | | |
|---|---|---|---|
| 1,807,472 | 5/1931 | Dodge | 33—82 |
| 2,124,793 | 7/1938 | Persons | 88—82 |
| 2,214,369 | 9/1940 | Hammarbach | 88—82 |
| 3,175,935 | 3/1965 | Vanstrum | 88—82 X |

JEWELL H. PEDERSEN, *Primary Examiner.*

C. E. QUARTON, *Assistant Examiner.*